May 28, 1963      A. GEE      3,091,054

GRAIN RIPENING MACHINE

Filed Sept. 8, 1961      3 Sheets-Sheet 1

INVENTOR.
ARTHUR GEE,
BY
McMorrow, Berman + Davidson
ATTORNEYS.

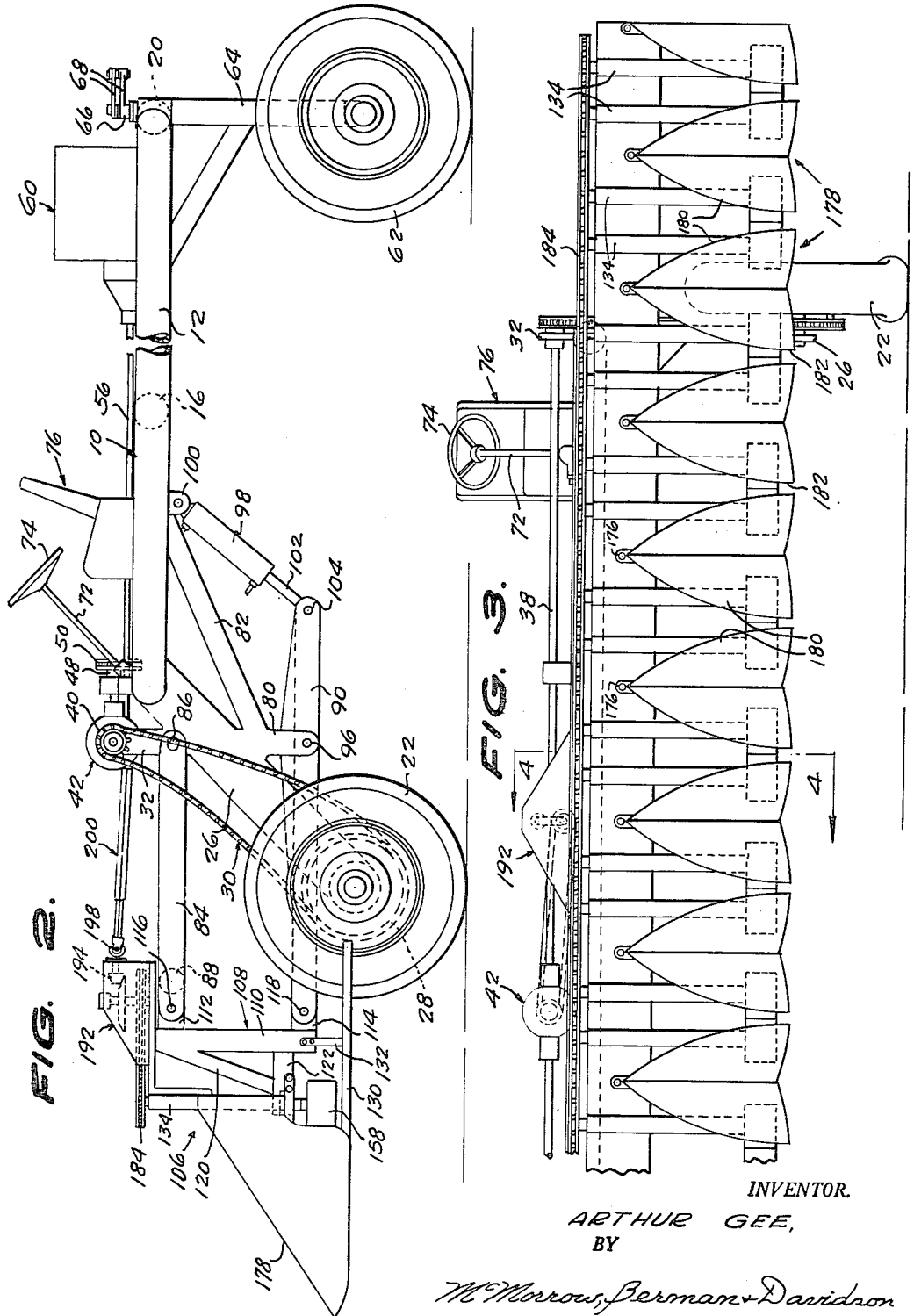

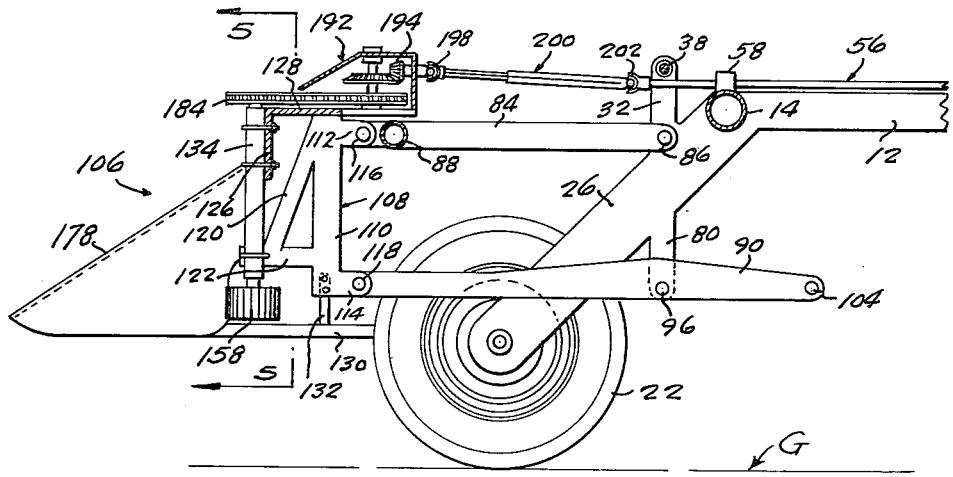

United States Patent Office 3,091,054
Patented May 28, 1963

3,091,054
GRAIN RIPENING MACHINE
Arthur Gee, Rte. 3, Kalispell, Mont.
Filed Sept. 8, 1961, Ser. No. 136,929
6 Claims. (Cl. 47—1)

This invention relates to a novel machine for hastening the ripening of standing grain by crushing portions of the straws or stems of the grain below the grain heads.

I have discovered that the ripening of standing grain can be substantially accelerated, once the grain is filled and is in the golden stage, by crushing the grain straws or stems, at locations below the grain heads, with the rolling action of compressible squeezing rollers.

The primary object of the present invention is the provision of an efficient, economical, and practical machine, for use in a grain field, which provides for crushing the straw of successive grain plants in a plurality of adjacent rows, and leaving ample standing straw for combine operation.

Another object of the invention is the provision of a machine of the character indicated wherein the grain straws are guided by two pairs of compressible crushing rollers which are of the same diameter, but are driven in opposite directions, at different speeds, higher than ground speed, whereby more efficient crushing of grain stalks is obtained, and gumming of the rollers is reduced or eliminated.

A further object of the invention is the provision of a self-propelled, rider operated machine of the character indicated above, whose frame is wheel supported on a level above standing grain and whose wheels are arranged so that minimum flattening of standing grain is assured.

Other important objects and advantageous features of the invention will be apparent from the following description and the accompanying drawings, wherein, for purposes of illustration only, a specific form of the invention is set forth in detail.

In the drawings:

FIGURE 2 is a contracted side elevation of the machine;

FIGURE 3 is a fragmentary front elevation thereof;

FIGURE 4 is a fragmentary vertical longitudinal section taken on the line 4—4 of FIGURE 3;

FIGURE 5 is a fragmentary vertical transverse section taken on the line 5—5 of FIGURE 4; and, FIGURE 6 is an enlarged fragmentary vertical longitudinal section taken on the line 6—6 of FIGURE 5.

Figure 1:
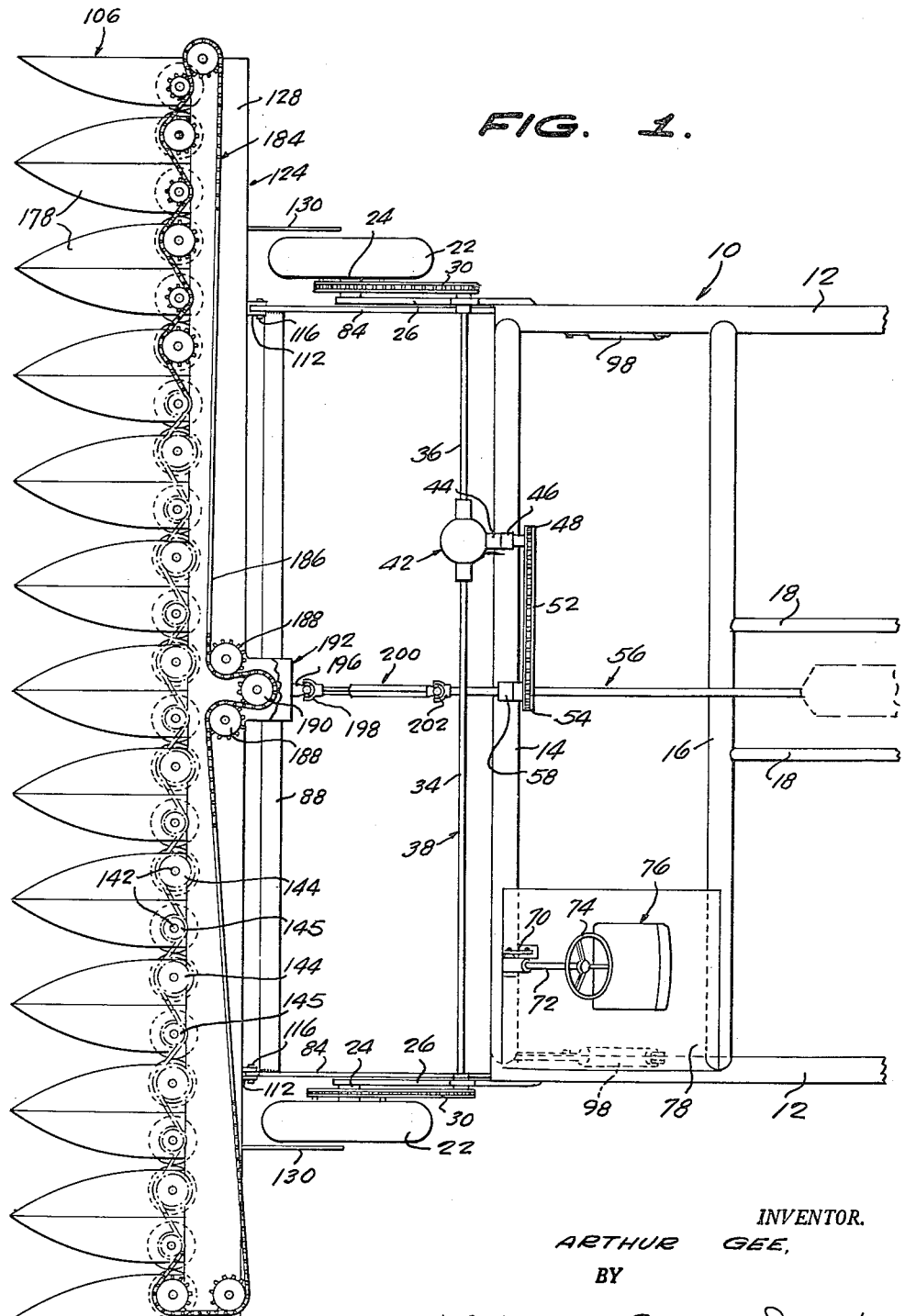
FIGURE 1 is a fragmentary top plan view of a machine of the present invention.

Referring in detail to the drawings, wherein like numerals designate like parts throughout the several views, the illustrated machine comprises an elongated open rectangular horizontal frame 10 comprising side members 12, connected, at their forward ends, by a front cross member 14, closely behind which is disposed an intermediate cross member 16. A pair of central longitudinal brace rods 18 extend rearwardly from the intermediate cross member 16 and are fixed to a rear cross member 20, which connects the side members 12, at their rear ends. The frame 10 is ground-supported, at its forward end, on drive wheels 22 which have stub axles 24 which are journalled on and extend laterally outwardly from the lower ends of forwardly declining flat arms 26 which are suitably fixed, at their elevated rear ends, to the outer sides of the frame side members 12, at the forward ends thereof. The stub axles 24 carry sprocket wheels 28, over which are trained drive chains 30.

Upstanding brackets 32, on upper parts of the arms 26 have journalled therethrough the ends of related sections 34 and 36 of a transverse horizontal drive shaft 38. The sections 34 and 36 have sprocket wheels 40, located outside of the brackets 32, over which the drive chains 30 are trained. The inner ends of the sections 34 and 36 are connected to a differential 42 which has a rearwardly extending housing portion 44 which is supported upon the front frame cross member 14, by a bracket 46. A shaft 48, journalled in the housing portion 44 extends rearwardly therefrom and carries a sprocket wheel 50, over which a chain 52 is trained.

The chain 52 is also trained over a sprocket wheel 54 on the forward end of a driven shaft 56, which is disposed centrally and longitudinally of the frame 10, the forward end of the driven shaft 56 being journalled through a bearing 58 upstanding on the front frame cross member 14. The shaft 56 is connected at its rear end, to a motor 60 which is mounted upon the brace rods 18, at the rear of the frame 10.

The frame 10 is ground-supported, at its rear end, by steerable wheels 62, mounted outboardly on the lower ends of fixed vertical standards 64 which are fixed to and reach downwardly from the rear frame cross member 20, in line with the side members 12. Vertical steering shafts 66 extend through the standards 64 and are fixed, at their lower ends, to the wheels 62. Lateral levers 68, on the upper ends of the shafts 66, are suitably and operatively connected together and to a lever 70, operated by rotation of the steering shaft 72 of a rider-operated steering wheel 74, which is located in front of a rider's seat 76, which is mounted, as indicated at 78, on the front cross member 14 and the intermediate cross member 16, at the left-hand side of the frame 10.

Pendant vertical brackets 80, in line with the brackets 32, extend downwardly from the front wheel supporting arms 26, behind the front drive wheels 22, and are braced by rearwardly inclined arms 82 which reach to and are fixed to the frame side members 12. Upper generally horizontal connecting levers 84 are pivoted, at their rear ends, as indicated at 86, to the brackets 32, where they meet arms 26. The levers 84 are spaced and connected, adjacent their forward ends, by a heavy tubular stabilizing cross bar 88. Parallel to and spaced beneath the levers 84 are rock levers 90, having forward ends which are vertically aligned with the forward ends of the connecting levers 84. The rock levers 90 extend rearwardly beyond the pendant brackets 80 and are pivoted, intermediate their ends, as indicated at 96, to the lower ends of the brackets 80. Two-way hydraulic cylinders 98 are pivoted, at their upper ends, as indicated at 100, to the undersides of the frame side member 12, and have piston rods 102 which extend forwardly and downwardly to and are pivoted, as indicated at 104, to the rear ends of the rock levers 90. Suitable operating controls (not shown) are provided for the cylinders 98.

A working assembly 106 is mounted on the forward ends of and extends transversely between the levers 84 and 90. The assembly 106 comprises a pair of transversely spaced brackets 108, which involve uprights 110 having rearwardly extending upper and lower ears 112 and 114, which are pivoted to the forward ends of the connecting levers 84 and the rock levers 90, as indicated at 116 and 118, respectively. On the forward sides of the uprights 110 are braces which comprise forwardly declining bars 120 and horizontal bars 122 which extend from the uprights to the lower ends of the declining bars 120.

An angle beam 124 extends between the brackets 108 and has a vertical flange 126 positioned in front of the uprights 110, and a rearwardly extending horizontal flange 128, which overlies and is suitably fixed upon the upper ends of the uprights 110. The beam 124 reaches laterally outwardly beyond the brackets 108, at its ends, and beyond the front wheels 22, as shown in FIGURE 1.

Horizontal longitudinal guard bars 130, disposed along the outer sides of the wheels 22, are supported, intermediate their ends, as indicated at 132, from the bracket uprights 110, on a level therebelow.

As shown in FIGURES 4 to 6, pairs of spaced perpendicular bearing tubes 134 are disposed along the front sides of the vertical flange 126 of the beam 124, at equally spaced intervals therealong, and are removably fixed in place, as by means of vertically spaced U-bolts 136 which embrace the tubes 34 and extend through the flange 126. Fixedly seated in the upper and lower ends of the tubes 134 are upper and lower anti-friction bearings 138 and 140, respectively, through which related portions of roller shafts 142 are journalled. The shafts 142 have sprocket wheels 144 and 145, fixed on their upper ends, which have hubs 146 which bear upon the inner races 148 of the upper bearings 138. The lower ends of the shafts 142 have reduced diameter portions 150 which define thrust shoulders 152, and the reduced portions and the shoulders engage related portions of axial bores 154, extending through the hubs 156 of rollers 158. The hubs 156 have counterbores 160, in their lower ends, and nuts 162 are threaded on the lower ends of the shafts 142, against washers 164 which bear against the bottoms of the counterbores. The hubs 156 have substantially full width peripheral grooves 165 which define upper and lower flanges 166 and 168, respectively, and compressible roller rings 170 are circumposed on the hubs 156, with the flanges 166 and 168 seated in grooves 170 and 172, provided in the tops and bottoms of the rings 170 and opening into their bores 174. As shown in FIGURE 5, the roller rings 170 on adjacent shafts 142 are in contact with each other.

Suitably mounted to the vertical flange 126 of the beam 124, as indicated at 176, and to the forward ends of the horizontal bars 122 on the uprights 110 of brackets 108, are sheet metal dividers 178 which straddle the spaces between adjacent pairs of rollers 158, and overlap the adjacent rollers of these pairs, as shown in FIGURES 1, 3 and 5. The dividers 178 are downwardly and forwardly tapering forms of downwardly opening V-shape. The side surfaces 180 of adjacent dividers curve downwardly and toward each other, and, at the level of the rollers 158 are closely spaced from each other, so as to define relatively narrow guide slots 182 which are in front of and are in longitudinal alignment with the points of contact of the roller rings 170, whereby the straws of standing grain aligned in rows, are positively guided, as the machine is moved forwardly, to be crushed between adjacent rollers.

As shown in FIGURE 1, one of the shafts 142 of adjacent pairs of these shafts is equipped with a relatively large diameter sprocket wheel 144, while the other shafts of the pairs have relatively small diameter sprocket wheels 145, whereby the shafts having the smaller sprocket wheels 145 are caused to rotate about 20% faster than the shafts having the larger sprocket wheels 144. Both shafts are driven at speeds greater than the ground speed of the machine, by means of a sprocket chain 184 which has a front flight which is engaged with the forward sides of the larger sprocket wheels 144 and with the rear sides of the smaller sprocket wheels 145.

The chain 184 has a rear flight 186, a middle portion of which is trained around the laterally inward sides of transversely spaced, vertical axis idler sprocket wheels 188, and around the rear side of a single vertical axis drive sprocket wheel 190 which is disposed between and rearwardly of the idler sprocket wheels 188. The sprocket wheels 188 and 190 are components of a gear box 192 which is suitably fixed upon and extends rearwardly from the middle of the horizontal flange 128 of the beam 124. The drive sprocket wheel 190 is driven through a gear train in the gear box 192, which includes a pinion 194 on a rearwardly extending shaft 196, which has a universal connection 198 to the forward end of a longitudinally extensible jack shaft 200, which, at its rear end, has a universal connection 202 to the forward end of the driven shaft 56. As shown in FIGURE 2, the front wheel drive chains 30 have sufficient slack therein to provide for free vertical adjustments of the working assembly 106, relative to the ground G, as may be required by the height of the standing grain being operated upon, the height adjustment of the assembly 106 being produced by operation of the hydraulic cylinders 98.

For adjusting adjacent rollers 158 toward or away from each other, for the proper contact between their roller rings 170, turnbuckles 204 are provided between adjacent bearing tubes 134 of pairs thereof, as shown in FIGURE 5.

The steerable wheels 62 track the front drive wheels 22, as the machine is driven forwardly in a grain field, so that there is maximum knock down of grain plants, and the supports for the working assembly 106 are relatively narrow and close to the wheels 22, so as to reduce to a minimum contact of the machine with standing grain passed by the assembly 106. Further, the frame 10 is supported on a level above the grain, so as to have no contact therewith.

In operation, the machine being driven forwardly in a grain field, grain straws are guided rearwardly between adjacent dividers 178, so that the straws, at locations beneath their heads, are guided to related pairs of adjacent rollers 158 which rotate toward each other, in rearward directions, so that the grain straws are pulled rearwardly between the rollers, and, in passing therebetween are crushed, in the manner and for the purpose set forth hereinabove.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A grain ripening machine comprising a wheeled frame, a working assembly mounted on the forward end of the frame, said assembly comprising a pair of vertical axis rollers having compressible rings thereon in lateral contact with each other, and divider means in front of the rollers and having a vertical guide slot longitudinally aligned with the point of contact of the roller rings, and means carried by the frame and operatively connected to the rollers for rotating the rollers in opposite rearward directions relative to each other.

2. A grain ripening machine comprising a wheeled frame, a working assembly mounted on the forward end of the frame, said assembly comprising a pair of vertical axis rollers having compressible rings thereon in lateral contact with each other, and divider means in front of the rollers and having a vertical guide slot longitudinally aligned with the point of contact of the roller rings, and means carried by the frame and operatively connected to the rollers for rotating the rollers in opposite rearward directions relative to each other, at different speeds of rotation.

3. A grain ripening machine comprising a wheeled frame, a working assembly mounted on the forward end of the frame, said assembly comprising a pair of vertical axis rollers having compressible rings thereon in lateral contact with each other, and divider means in front of the rollers and having a vertical guide slot longitudinally aligned with the point of contact of the roller rings, and means carried by the frame and operatively connected to the rollers for rotating the rollers in opposite rearward directions relative to each other, at different speeds of rotation, said rollers comprising hubs having peripheral grooves, said rings being circumposed on the hubs and securably engaged in the grooves.

4. A grain ripening machine comprising a wheeled frame, a working assembly mounted on the forward end of the frame, said assembly comprising a pair of vertical axis rollers having compressible rings thereon in lateral contact with each other, and divider means in front of the rollers and having a vertical guide slot longitudinally aligned with the point of contact of the roller rings, and means carried by the frame and operatively connected to the rollers for rotating the rollers in opposite rearward directions relative to each other, at different speeds of rotation, said assembly comprising a transverse beam, said rollers having upstanding shafts, vertical bearing tubes fixed to said beam, upper and lower bearings fixed on the tubes through which the roller shafts are journalled.

5. A grain ripening machine comprising an open rectangular horizontal frame, ground engaging wheel means supporting the frame above the ground, upper and lower parallel spaced lever means pivoted on and extending forwardly from the frame, a working assembly pivoted on the forward ends of said lever means, and spaced above the ground, height adjusting means for said assembly comprising means acting between the frame and the lower lever means, said working assembly comprising a transverse horizontal beam, pairs of vertical axis rollers mounted on the beam and spaced therebelow, said pairs being spaced from each other lengthwise of the beam, said pairs of rollers having compressible grain straw crushing rings in contact with each other, means carried by the frame and operatively connected to the rollers for rotating the rollers in opposite rearward directions relative to each other, and dividers mounted on and extending forwardly from said beam on a level with the rollers, said dividers straddling the spaces between adjacent pairs of rollers and having guide slots longitudinally aligned with the points of contact of the pairs of rollers.

6. A grain ripening machine comprising an open rectangular horizontal frame, ground engaging wheel means supporting the frame above the ground, upper and lower parallel spaced lever means pivoted on and extending forwardly from the frame, a working assembly pivoted on the forward ends of said lever means, and spaced above the ground, height adjusting means for said assembly comprising means acting between the frame and the lower lever means, said working assembly comprising a transverse horizontal beam, pairs of vertical axis rollers mounted on the beam and spaced therebelow, said pairs being spaced from each other lengthwise of the beam, said pairs of rollers having compressible grain straw crushing rings in contact with each other, means carried by the frame and operatively connected to the rollers for rotating the rollers in opposite rearward directions relative to each other, and dividers mounted on and extending forwardly from said beam on a level with the rollers, said dividers straddling the spaces between adjacent pairs of rollers and having guide slots longitudinally aligned with the points of contact of the pairs of rollers, said rollers having upstanding shafts having sprocket wheels on their upper ends, the sprocket wheels on the shafts of each pair of rollers comprising a relatively large diameter sprocket wheel and a relatively small diameter sprocket wheel, said rotating means comprising a sprocket chain trained alternately around the front and rear sides of adjacent large and small diameter sprocket wheels.

References Cited in the file of this patent

UNITED STATES PATENTS

| | | |
|---|---|---|
| 9,400 | Chichester | Nov. 16, 1852 |
| 840,784 | Lowe | Jan. 8, 1907 |
| 2,337,698 | Walz | Dec. 28, 1943 |
| 2,639,553 | Russell | May 26, 1953 |
| 2,685,149 | Hvistendahl | Aug. 3, 1954 |